United States Patent [19]

Davies, III

[11] 4,214,767
[45] Jul. 29, 1980

[54] FUEL TANK INCLUDING AIR ENTRAPMENT CHAMBERS

[75] Inventor: John W. Davies, III, Plymouth, Wis.

[73] Assignee: Gilson Brothers Company, Plymouth, Wis.

[21] Appl. No.: 935,611

[22] Filed: Aug. 21, 1978

[51] Int. Cl.² .............................................. B60K 15/02
[52] U.S. Cl. ................................. 280/5 A; 220/86 R; 220/DIG. 13
[58] Field of Search ............. 280/5 A, 5 R, 5 H, 5 D; 137/206; 220/DIG. 13, 85 F, 86 R; D12/155

[56] References Cited

U.S. PATENT DOCUMENTS

| D. 188,738 | 8/1960 | Voelz | D12/155 |
| 2,407,622 | 9/1946 | Wells | 220/86 R |
| 2,507,069 | 5/1950 | Vincent | 244/135 R |

FOREIGN PATENT DOCUMENTS

| 1440675 | 4/1966 | France | 280/5 A |
| 2213113 | 9/1973 | Fed. Rep. of Germany | 220/85 F |

Primary Examiner—John A. Pekar

[57] ABSTRACT

A lawn tractor including a fuel tank constructed to permit tipping of at least 30° with respect to the horizontal without spilling of gasoline from the tank. The fuel tank includes a bottom wall, side walls and a top wall, the top wall supporting a central filling stem. The top wall and side walls define a pair of air entrapment cavities at the periphery of the fuel tank and located above the base of the filling neck. When the fuel tank is level and filled, air is trapped in the entrapment cavities. If the tank is subsequently tipped, air is permitted to escape from one of the cavities into the filling neck and fuel will flow into that cavity thereby preventing the fuel in the filling neck from being spilled.

7 Claims, 4 Drawing Figures

FUEL TANK INCLUDING AIR ENTRAPMENT CHAMBERS

BACKGROUND OF THE INVENTION

The present invention relates to fuel tanks for use in gasoline powered implements such as lawn and garden tractors and more particularly to such tractors having a fuel tank which can be tilted to at least 30 degrees from the horizontal without spilling fuel therefrom.

Since lawn and garden tractors are frequently used on substantial slopes, it is desirable that the fuel tanks be designed to avoid spilling when the fuel tanks are tilted. Though the caps of such fuel tanks commonly function to restrict spilling of fuel through the filling neck of the fuel tank, such caps generally require a vent to permit escape of gases from the fuel tank. Spilling of fuel can be caused, in such fuel tanks, when the tank is tipped and fuel fills the tank filling neck, and when a pressure increase in the tank causes the liquid in the filling neck to be forced through the vent with escaping gases. Thus it is desirable that the fuel tank have a construction preventing fuel from flowing into the filling neck when the fuel tank is tipped.

SUMMARY OF THE INVENTION

Accordingly, the present invention provides a lawn tractor having an improved fuel tank constructed to prevent spilling of fuel by reducing the amount of fuel flowing into the filling neck of the fuel tank when the fuel tank is tipped.

The invention includes a lawn tractor comprising a frame, wheels supporting the frame for movement on the ground, a gasoline engine drivingly connected to the wheels for driving the wheels, and a fuel tank connected to the gasoline engine. The fuel tank includes a fuel reservoir, a filling neck communicating with the fuel reservoir and at least two gas entrapment chambers positioned above the reservoir and in fluid communication with the reservoir, the entrapment chambers being spaced from the stem and for trapping gas therein when the fuel tank is filled and for receiving fuel when the fuel tank is tipped, one of the entrapment chambers positioned on one side of the stem and the other of the entrapment chambers positioned on another side of the stem.

Other features and advantages of the invention will become apparent to those skilled in the art upon reviewing the following detailed description, the drawings and the appended claims.

Figure 1:
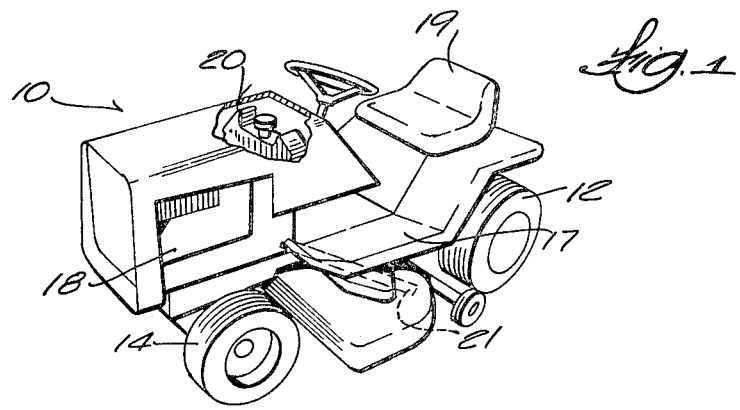
FIG. 1 shows a garden tractor having a fuel tank embodying the present invention.

Before explaining one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in the drawings is a riding type power lawn mower 10 having driven rear wheels 12 and steerable front wheels 14. The lawn mower 10 includes at least one rotary cutting blade positioned between the front and rear wheels 14 and 12, the rotary cutting blade being rotatably driven about a vertical axis by an internal combustion engine 18 mounted at a forward position on the tractor by conventional means. At the rear of the lawn tractor is an operator's platform 17 provided for supporting an operator's seat 19. The engine 18 is drivingly connected to the rear wheels. The lawn tractor 10 also includes a fuel tank 20 shown in FIG. 1 as being mounted rearwardly of the engine 18 and above the rotary cutting blade 21. The fuel tank 20 is shown in greater particularity in FIGS. 2 through 4.

The fuel tank 20 of the lawn tractor 10 includes a bottom wall 22, a plurality of side walls 24 integrally connected to the bottom wall 22 and extending vertically upwardly therefrom, and a top wall 26. The bottom wall 22 and the side walls 24 define a generally rectangular fuel reservoir 28 therein. The top wall 26 supports a centrally disposed cylindrical filling neck 30 having an outer threaded portion 32 adjacent its upper end for threadably receiving a fuel tank cap 33. An outlet port 35 is provided in the bottom wall 22, the outlet port 35 including a downwardly extending tube 37 for attachment to a fuel line 39.

The fuel tank 20 also includes a pair of spaced apart entrapment chambers 34 and 36 located above and opening downwardly into the reservoir 28. Each of the entrapment chambers 34 and 36 are intended to entrap air therein when the fuel tank is being filled, and function to hold fuel and prevent spilling of fuel through the filling neck 30 in the event that the fuel tank is tipped. The gas entrapment chambers 34 and 36 are located above the base 38 of the filling neck 30 and open downwardly into the fuel reservoir 28, the openings of the entrapment chambers 34 and 36 being coplanar with the base 38 of the filling neck 30. In a preferred embodiment of the invention, the entrapment chambers 34 and 36 are spaced apart and are spaced outwardly from the filling neck 30 such that they are located adjacent the periphery of the fuel reservoir 28.

The top wall 26 includes an annular inner wall portion 40 surrounding the base 38 of the filling neck 30 and extending outwardly therefrom, and at least two outer top wall portions 42 and 44 defining the top walls of the entrapment chambers 34 and 36 respectively. The outer top wall portion 42 and the inner top wall portion 40 are joined integrally by an intermediate or inner wall portion 46 therebetween. The top wall portion 44 and the inner wall portion 40 are similarly joined by an intermediate wall portion 48.

In a preferred form of the invention, the fuel tank is supported on the lawn tractor 10 such that the entrapment chambers 34 and 36 are spaced apart in a direction transverse to the intended direction of motion of the tractor. The entrapment chambers 34 and 36 are also mutually independent, and fluid communication between the entrapment chambers is provided only through the reservoir 28.

Figure 2:
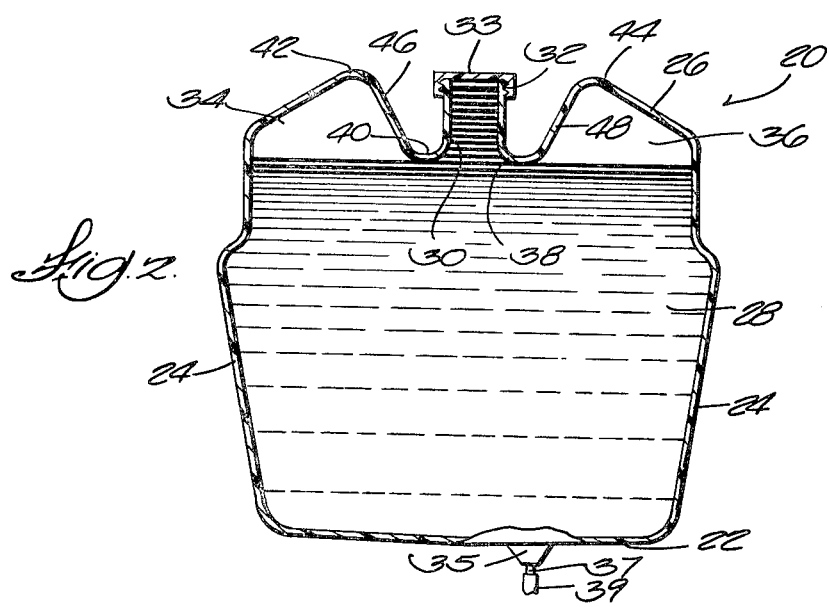
FIG. 2 is an enlarged side elevation cross section view of the fuel tank shown in FIG. 1.
Figure 3:
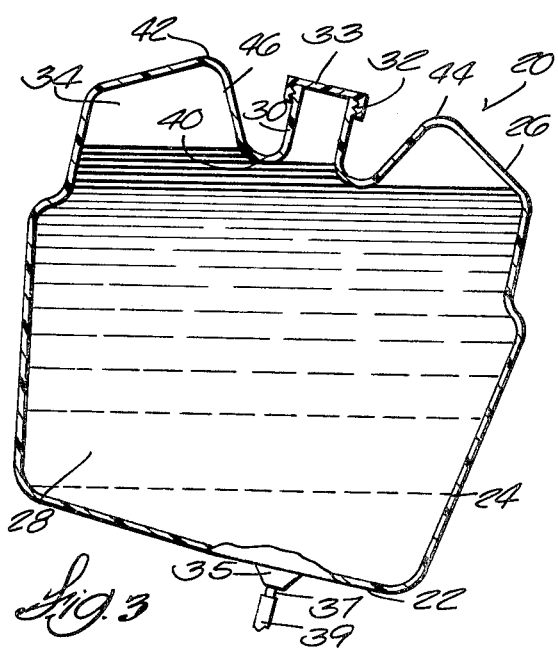
FIG. 3 is a view similar to FIG. 2 but showing the fuel tank tipped slightly.
Figure 4:
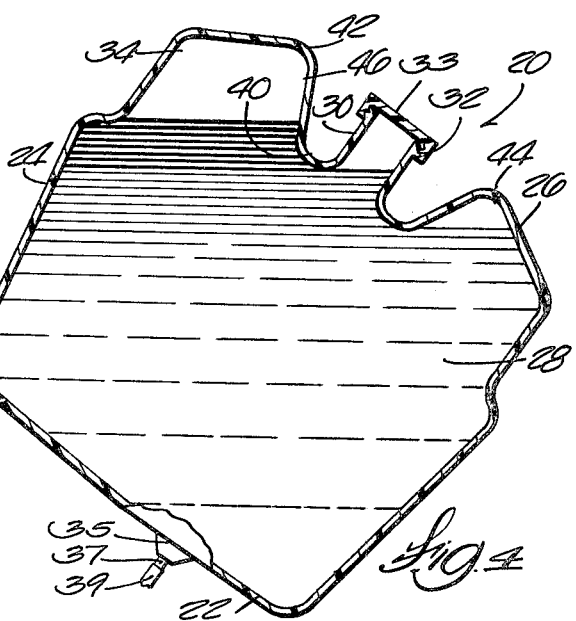
FIG. 4 is a view similar to FIGS. 2 and 3 but showing the fuel tank tipped further.

When the fuel tank 20 is completely filled as illustrated in FIG. 2, air is trapped in the entrapment chambers 34 and 36. If the lawn tractor 10 and the fuel tank 20 are then caused to be tipped during operation of the lawn tractor, as shown in FIG. 3, some of the air entrapped in the entrapment chamber 36 during filling of the fuel tank will move past the inner wall portion 40 into the filling neck 30 and liquid fuel will be permitted to enter the entrapment chamber 36. Accordingly, the level of fuel in the filling neck 30 will be lowered and fuel will not be spilled out of the filling neck. Continued tipping will cause further air flow from the entrapment chamber 36 into the filling neck, so that even though the fuel tank is further tipped to the position shown in FIG. 4, fuel will not be spilled.

Various of the features of the invention are set forth in the following claims.

I claim:

1. A lawn tractor comprising a frame, wheels supporting said frame for movement on the ground, a gasoline engine drivingly connected to said wheels for driving said wheels, and a fuel tank connected to said gasoline engine, said fuel tank including a fuel reservoir, a filling neck communicating with said reservoir, and at least two spaced apart mutually independent gas entrapment chambers above said reservoir and in fluid communication with said reservoir and for trapping gas when said tank is tipped, one of said entrapment chambers positioned on one side of said filling neck and the other of said entrapment chambers positioned on an opposite side of said filling neck.

2. A lawn tractor as set forth in claim 1 wherein said filling neck includes a base, and wherein said entrapment chambers are positioned above said base and each include an opening into said reservoir, said base being coplanar with said openings.

3. A lawn tractor as set forth in claim 2 and further including a flange extending from said base outwardly to said entrapment chambers, said flange defining at least a portion of an upper wall of said reservoir.

4. A lawn tractor as set forth in claim 1 wherein said entrapment chambers are spaced apart in a direction transverse to the direction of motion of said tractor, and wherein when said fuel tank is filled, said gas entrapment chambers are isolated from one another.

5. A lawn tractor comprising:
a frame;
wheels supporting the frame for movement on the ground;
a gasoline engine drivingly connected to the wheels for driving the wheels; and
a fuel tank connected to the gasoline engine, the fuel tank including a bottom wall, a plurality of side walls integrally connected to said bottom wall, a top wall integrally connected to said side walls, said bottom wall, side walls and top wall defining a reservoir therein, and said top wall including a pair of spaced apart outer peripheral top wall portions, an inner top wall portion spaced from said outer peripheral portions toward said bottom wall, and a pair of inner walls, one of said inner walls joining said inner top wall portion and another of said peripheral top wall portions, a generally cylindrical filling neck centrally located within said inner portion and integrally connected to said inner portion and extending away from said bottom wall and defining an opening to said reservoir, said side walls, peripheral top wall portions, and said inner wall defining at least two separate and independent mutually spaced apart gas entrapment chambers spaced from said filling neck and above said inner wall for trapping gas therein when said tank is filled and for holding fuel when said tank is tipped, one of said entrapment chamber portions positioned on one side of said filling neck and the other of said entrapment chamber portions positioned on another side of said filling neck.

6. A lawn tractor as set forth in claim 5 wherein said filling neck includes a base and wherein said entrapment chambers are positioned above said base and each include an opening providing communication between said entrapment chambers and said reservoir, said base being coplanar with said openings.

7. A lawn tractor as set forth in claim 5 wherein said entrapment chambers are spaced apart in a direction transverse to the direction of motion of said tractor.

* * * * *